(12) United States Patent
Becker et al.

(10) Patent No.: US 11,365,516 B2
(45) Date of Patent: Jun. 21, 2022

(54) RECYCLABLE RELEASE SUBSTRATE

(71) Applicant: Mitsubishi HiTec Paper Europe GmbH, Bielefeld (DE)

(72) Inventors: Dieter Becker, Georgsmarienhuette (DE); Nadia El-Karzazi, Bielefeld (DE); Konstantinos Kalessios, Frankfurt (DE); Jochen Schlegel, Heroldsberg (DE); Nora Wilke, Flensburg (DE); Claas Boxhammer, Herford (DE)

(73) Assignee: MITSUBISHI HITEC PAPER EUROPE GMBH, Bielefeld (DE)

( * ) Notice: Subject to any disclaimer, the term of this patent is extended or adjusted under 35 U.S.C. 154(b) by 100 days.

(21) Appl. No.: 16/228,199

(22) Filed: Dec. 20, 2018

(65) Prior Publication Data

US 2019/0194872 A1 Jun. 27, 2019

(30) Foreign Application Priority Data

Dec. 22, 2017 (DE) .......................... 102017131276.5

(51) Int. Cl.
  *D21H 27/00* (2006.01)
  *D21H 19/44* (2006.01)
  *C09J 7/40* (2018.01)
  *D21H 19/42* (2006.01)

(52) U.S. Cl.
  CPC ............ *D21H 27/001* (2013.01); *C09J 7/401* (2018.01); *C09J 7/403* (2018.01); *D21H 19/42* (2013.01); *D21H 19/44* (2013.01); *C09J 2203/334* (2013.01); *C09J 2400/283* (2013.01)

(58) Field of Classification Search
  CPC ....... D21H 27/001; D21H 19/42; C09J 7/403; C09J 7/401; C09J 2203/334; C09J 2400/283; C09D 2491/005
  See application file for complete search history.

(56) References Cited

U.S. PATENT DOCUMENTS

| | | | |
|---|---|---|---|
| 2,219,071 A | 10/1940 | Humphner | |
| 3,898,114 A * | 8/1975 | Ward | D21H 27/001 |
| | | | 156/90 |
| 4,021,060 A | 5/1977 | Seeley et al. | |
| 4,117,198 A * | 9/1978 | Power | C09D 161/32 |
| | | | 428/452 |

(Continued)

FOREIGN PATENT DOCUMENTS

| | | |
|---|---|---|
| DE | 4425737 | 2/1996 |
| DE | 60 2004 005746 | 8/2007 |

(Continued)

OTHER PUBLICATIONS

Bos, et al., Chapter 2: Handbuch der Papierherstellung, 1999, vol. 1, pp. 378-385, XP055893694.

(Continued)

*Primary Examiner* — Scott R. Walshon
(74) *Attorney, Agent, or Firm* — Cozen O'Connor

(57) ABSTRACT

A release substrate includes: a carrier substrate having a front side and a reverse side opposite the front side, and a release layer disposed on the front side and/or reverse side of the carrier substrate. The release layer includes a polymeric binder and a wax based on a vegetable oil.

12 Claims, 5 Drawing Sheets

(56) References Cited

U.S. PATENT DOCUMENTS

| | | | | |
|---|---|---|---|---|
| 5,635,279 | A * | 6/1997 | Ma | D21H 19/16 428/174 |
| 5,716,698 | A * | 2/1998 | Schreck | B32B 27/20 428/323 |
| 5,807,781 | A | 9/1998 | Reinhardt et al. | |
| 6,670,010 | B2 * | 12/2003 | Nagamoto et al. | |
| 7,972,670 | B2 * | 7/2011 | Seitz | C09J 7/38 428/40.1 |
| 2004/0076745 | A1 * | 4/2004 | Hassan | D21H 19/18 427/155 |
| 2005/0131103 | A1 * | 6/2005 | Hassan et al. | |
| 2006/0063013 | A1 | 3/2006 | Ikeda et al. | |
| 2008/0015107 | A1 | 1/2008 | Elmasry et al. | |
| 2015/0037576 | A1 | 2/2015 | Kataoka et al. | |

FOREIGN PATENT DOCUMENTS

| | | |
|---|---|---|
| DE | 102007028497 | 12/2008 |
| DE | 112007002203 T5 | 7/2009 |
| DE | 112009003792 B4 | 10/2020 |
| EP | 1231073 | 8/2002 |
| EP | 2993055 | 3/2016 |
| EP | 3219506 | 9/2017 |
| JP | 2015-030768 | 2/2015 |
| JP | 2016-210041 | 12/2016 |
| WO | WO 2004/083310 | 9/2004 |
| WO | WO 2015/012386 | 1/2015 |
| WO | WO 2017/170462 | 10/2017 |

OTHER PUBLICATIONS

Anonymous, "Wachs", Wikipedia, (Mar. 6, 2017), pp. 1-3, URL: https://web.archive.org/web/20170306 014831/ https://de.wikipedia.org/wiki/Wachs, XP055893663.

Beyer, Walter, "Fette, öle und wachse", Lehrbuch Der Organischen Chemie, Stuttgart, 1984, vol. 20, pp. 233-234, XP055893659.

Gruber, "Chemie der Oberflächenveredelung", Papier—und Polymerchemie; Vorlesungsskriptum zum Lehrgang Papiertechnik an der dualen hochschule karlsruhe, pp. 1-45, XP055893707.

"Wachse", Thieme, RÖMPP Chemielexikon, 2007, pp. 1-5, XP055893664.

* cited by examiner

RECYCLABLE RELEASE SUBSTRATE

BACKGROUND OF THE INVENTION

1. Field of the Invention

The present invention relates to a release substrate (e.g., release paper), to the use of a release substrate for protection of tacky surfaces of self-adhesive labels from soiling or inadvertent sticking, and to a process for producing a release substrate.

2. Description of the Related Art

The use of self-adhesive labels is extremely popular in numerous applications. For example, medical plasters, self-adhesive decoration films, protective films, postage stamps, parcel labels, advertising labels, vignettes or price labels are being supplied and used in the form of self-adhesive labels. It is also customary to apply self-adhesive labels to products, in which case the labels bear, for example, information from the manufacturer, instructions or a guarantee form. The possibility of making labels printable has additionally extended the field of use of self-adhesive labels; for example, printable self-adhesive labels are being used largely universally in retail for labeling of products for self-weighing or in public transport—for example as luggage labels.

Self-adhesive labels are equipped with an adhesive layer that enables sticking of the self-adhesive label to the desired site of use. Until the self-adhesive label is used, the adhesive layer is typically covered by a separate release paper, such that the adhesive layer is not contaminated or the self-adhesive label does not already stick before the desired use. The use of a separate release paper is preferred particularly in the case of pre-diecut labels. In the case of a continuous roll of labels, it is much more popular, and also more practical, when the labels have coatings on the front side that have release properties with respect to the adhesive layers on the reverse side. In this case, the adhesive layers on the reverse side are covered by the release layers on the front side until they are used. Since the self-adhesive labels thus act as their own release paper, it is possible to dispense with a separate release paper, and so there is no need to dispose of the release paper at the site of use. This technique has been found to be particularly useful in the case of labels that are printed and used on the spot. Without a release paper or a release layer, it would barely possible to store labels.

In this connection, heat-sensitive recording materials in particular, in the form of self-adhesive labels, have been found to be useful. Heat-sensitive recording materials that react in a color-forming manner to the supply of external heat have been known for many years and are enjoying basically unlimited popularity, one reason for which is that their use by any businessman issuing tickets and/or sales receipts and/or entry tickets is associated with great advantages. Because the coloring components, i.e., dye precursor and (color) developers that react with them when heat is supplied—also called color acceptors—are present in the recording material itself in such a heat-sensitive recording method, it is therefore possible to set up a large number of toner- and color cartridge-free thermal printers that no longer have to be checked regularly by anyone in terms of their function.

Release papers used are typically papers coated with a silicone-containing release layer. Although the adhesive layer of the self-adhesive labels sticks to the silicone-containing release layers of the release paper, the labels can be detached (delaminated) from the release paper in a residue-free and simple manner.

DE 60 2004 005 746 T2 describes printing inks including, as well as color pigments, an organic solvent, an "acrylic resin dispersant", also a wax obtained from vegetable sources.

DE 44 25 737 A1 describes the production of release papers having release properties with respect to adhesive layers, wherein paper webs are coated with a silicone layer.

However, these silicone-containing release papers cannot directly be sent to paper recycling since the silicone-containing layers disrupt the recycling process. More particularly, it is problematic that the silicone-containing layers are not water-soluble. The silicones are introduced into the stock preparation with the used paper and, as tacky impurities or soil, lead to disrupted production and quality problems in the paper product to be produced from the used paper. Since use of used paper in Germany over all types of paper is currently above 70%, it is desirable to find alternatives to silicone-containing layers that can be better recycled. Nor is it possible to compost these silicone-containing release papers since the silicone-containing layers used are not biodegraded.

Growing concern about the lack of fossil, non-renewable resources, such as mineral oil or natural gas, has additionally led to a constantly growing interest in the production of materials from renewable raw materials. In this connection, reference is made, for example, to polyethylene furanoate, a plastic based on 2,5-furandicarboxylic acid, the starting substances for which can be produced from sugars. However, the materials made from renewable raw materials that are known to date do not exhibit release properties, and so it has not been possible to date to dispense with silicones in release coatings.

SUMMARY OF THE INVENTION

It is an object of the present invention to provide a release substrate that has release properties with respect to adhesives, can at the same time be produced entirely or predominantly from renewable raw materials, and in the case of which it is possible to dispense with the use of silicones. In addition, it is desirable when the release substrate has good reusability or biodegradability, i.e., compostability.

According to one aspect of the present invention, this object may be achieved by a release substrate (10) comprising a) a carrier substrate (11) having a front side and a reverse side opposite the front side, and b) a release layer (12) disposed on the front side and/or reverse side of the carrier substrate, wherein the release layer (12) comprises or consists of a polymeric binder and a wax based on a vegetable oil.

It has been found that, surprisingly, release substrates of the invention have release properties and can be produced entirely or predominantly from renewable raw materials. The use of a polymeric binder surprisingly modifies the release layer such that it does not become detached from the carrier substrate or that the wax is transferred to other articles or the labels. Release substrates of the invention may be produced entirely without the use of silicones or perfluorinated compounds.

In the context of this invention, a wax based on a vegetable oil is understood to mean a wax obtained by chemical modification of a vegetable oil. The chemical modification may, for example, be a partial or complete hydrogenation with a metallic catalyst, for example nickel, and hydrogen, wherein all or some of the double bonds in the oil are hydrogenated to single bonds. Unlike vegetable oils, waxes are not in liquid form but in solid form at 20° C. The effect of the chemical modification of the vegetable oil is thus an increase in the melting point.

A vegetable oil is understood to mean a fatty acid triglyceride that is obtained from plants or plant parts. The oil is typically obtained by pressing, extraction or refining of the oils from the plants or plant parts. The obtaining of the oils is known to the person skilled in the art. If plant seeds are used for obtaining oil, these are referred to as oilseeds. The oil in the seeds is in the form of lipids that constitute the cell membranes and energy reserves thereof. Depending on the proportion of unsaturated fatty acids in the oil, a distinction is made between nondrying oils (for example olive oil), semidrying oils (for example soya oil or rapeseed oil) and drying oils (for example linseed oil or poppyseed oil). The term "drying" here does not mean evaporation, but rather the solidification of the oil caused by oxidation and polymerization of the unsaturated fatty acids. Preference is given to the use of semidrying and drying oils as starting material for production of the waxes used in accordance with the invention.

Possible sources for vegetable oil are açaí oil, algae oil, argan oil (from the fruit of the argan tree), avocado oil (from the fruit flesh of the avocado from the avocado tree), babaçu oil, cottonseed oil (from the seeds of the cotton plant), borage oil or borageseed oil (from the seeds of the borage plant), cupuaçu butter, cashewshell oil, safflower oil (also called "saflor oil", from the seeds of the safflower or carthamus), peanut oil (from the fruit of the peanut plant), hazelnut oil (from hazelnuts from the hazelnut bush), hemp oil (from the seeds of edible hemp), *jatropha* oil (from the seeds of *Jatropha curcas*), jojoba oil (actually a liquid wax; from the seeds of the jojoba bush), *camellia* oil (from the seeds of *Camellia* oleifera, *camellia* sinensis or *camellia* japonica), cocoa butter, coconut oil (from the seed flesh of the coconut, the tree fruit of the coconut palm), pumpkinseed oil (also referred to as seed oil; from the seed kernels of the Styrian oil pumpkin), linseed oil (from ripe linseeds from flax), false flax oil (from the seed of the false flax, Brassicaceae family), macadamia oil (from the nuts of the macadamia tree), maize kernel oil (from the kernels of maize), almond oil (from almonds from the almond tree), mango butter (from *Mangifera indica*), apricot kernel oil (from the apricot kernel—i.e., the almond of the apricot stone—the apricot), poppyseed oil (from the seed grains of the poppy), evening primrose oil, olive oil (from the fruit flesh and core of the olive, the fruit of the olive tree), palm oil (from the fruit flesh of the palm fruit, the fruit of the oil palm), palm kernel oil (from the kernels of the palm fruit, the fruit of the oil palm), papaya oil, pistachio oil, pecan nut oil, perilla oil from the seeds of the perilla plant (shiso, sesame leaf), rapeseed oil (from the seeds of rape, Brassicaceae family), rice oil, castor oil (from the seeds of the castor oil plant), sea buckthorn oil (from the fruit flesh of the sea buckthorn berry, the fruit of the sea buckthorn bush), sea buckthorn kernel oil (from the kernels of the sea buckthorn berry, the fruit of the sea buckthorn bush), mustard oil (from the seed kernels of black mustard), black cumin oil (from the seeds of the fruit capsule of the black cumin plant), sesame oil (from the seeds of the sesame plant), shea butter (from the seeds of the shea nut tree), soya oil (from the beans of the soybean), sunflower oil (from the kernels of the sunflower), tung oil, walnut oil (from the kernels of the nuts from the walnut tree), watermelonseed oil, grapeseed oil (from the seeds of the fruits (grapes) of the grape plant or grapevine), wheat germ oil (from the germ of wheat) and/or cedar oil (from the wood of the Lebanon cedar). This list should not be regarded as conclusive; it shows ways of obtaining vegetable oils that can be converted to a wax used in accordance with the invention.

Preference is given in accordance with an aspect of the invention to a release substrate wherein the wax based on a vegetable oil is a wax based on an oil selected from the list comprising palm oil, coconut oil, poppyseed oil, olive oil, linseed oil, soya oil, sunflower oil, safflower oil and rapeseed oil, the wax based on a vegetable oil preferably being a wax based on a soya oil i.e., soya oil wax or soya wax.

In-house studies have shown that waxes made from the oils specified as preferred above have particularly good properties. The waxes produced from these oils are notable for high durability and can be produced with high melting points. The waxes used in accordance with the invention, namely palm oil wax, coconut oil wax, poppyseed oil wax, olive oil wax, linseed oil wax, soya oil wax, sunflower oil wax, safflower oil wax and rapeseed oil wax, show a significant increase in release properties when used in release substrates of the invention. In particular, the use of soya oil wax is preferred in accordance with the invention. In-house studies have shown that, when soya oil wax is used, not only the release properties but also very good mechanical properties can be obtained. Soya oil wax additionally has the advantage that it can be produced in taste- and odor-neutral form and hence can also be used for labels that come into contact with food.

Preference is given in accordance with an aspect of the invention to release substrates wherein the wax has a melting point above 40° C., preferably above 50° C., more preferably above 60° C.

In-house studies have shown that it is already possible to achieve very good results when waxes having a melting point above 20° C. are used. However, it has been found that, surprisingly, when waxes having a melting point above 40° C. are used, the resistance of the release substrates to mechanical stress can be enhanced. This resistance is enhanced even further at even higher melting points of the waxes. In-house studies have additionally shown that the optimal melting point of the waxes is in the range from 60 to 80° C. if the release substrates are to be used at temperatures between 6° C. and 30° C. If the release substrates are also to be employed at higher temperatures, it may be advisable to use a wax having a higher melting point.

Preference is given in accordance with the invention to release substrates wherein the proportion by mass of the wax in the release layer is 6% (preferably 10%) to 98%, preferably 20% to 90%, more preferably 50% to 89%, based on the total mass of the release layer.

In-house studies have shown that, surprisingly, there is a significant decrease in release properties in the case of a wax material content below 6%, whereas excellent release properties can be obtained in the case of a wax material content above 98%, but there is a disproportionately significant decrease in the mechanical stability of the release layer. In-house studies have shown that particularly good release substrates with optimal release and mechanical properties can be obtained when the wax material content is 50% to 89%.

Even though the scope of the present invention is in no way restricted to the use of paper as carrier substrate, paper and here specifically a non-surface-treated coating base paper is the carrier substrate that has become established on the market even with regard to good environmental compatibility owing to its good recyclability, preferred in accordance with the invention. A non-surface-treated coating base paper is a coating base paper that has not been treated in a size press or in a coating apparatus.

For the invention, to the same degree, films of polypropylene, polyolefin and polyolefin-coated papers, for example, are possible as substrate, albeit not preferred with regard to the environmental effects of such plastic or plastic-coated papers, without such a remark being of exclusive character.

Preference is thus given in accordance with an aspect of the invention to release substrates wherein the carrier substrate is a paper, a paperboard or a film.

In the context of the present invention, a polymeric binder is understood to mean a binder that has been formed by polycondensation from a multitude of molecules, and in which one or more kinds of atoms or atomic moieties (called repeat units) are in repeating succession and the number of repeat units is more than 25.

Suitable polymeric binders are all binders that are customary in papermaking. However, in-house studies have shown that a suitable selection of the binder can significantly improve the mechanical properties of the release layer and/or the biodegradability of the release substrate. In-house studies have shown that it is advantageous and hence preferable in accordance with the invention when the polymeric binder is a crosslinked or uncrosslinked binder selected from the group consisting of starch, polyvinyl alcohol, carboxyl group-modified polyvinyl alcohol, ethylene-vinyl alcohol copolymer, a combination of polyvinyl alcohol and ethylene-vinyl alcohol copolymer, ethylene-vinyl acetate copolymer, silanol group-modified polyvinyl alcohol, diacetone-modified polyvinyl alcohol, modified polyethylene glycol, unmodified polyethylene glycol, α-isodecyl-ω-hydroxy-poly(oxy-1,2-ethanediyl), styrene-butadiene latex, styrene-acrylate polymers, acrylic polymers and mixtures thereof.

In-house studies have shown here that release substrates of the invention have particularly high resistance to grease, oil and moisture when the polymeric binder is or comprises one or more styrene-acrylate polymers. Elevated resistance to grease, oil and moisture is likewise desirable in release substrates and also leads to better release properties.

It is preferable here in accordance with an aspect of the invention when the proportion by mass of the polymeric binder in the release layer is 94% to 2%, preferably 80% to 10%, more preferably 50% to 11%, based on the total mass of the release layer.

In-house studies have shown that a content of polymeric binders below a proportion by mass of 2% leads to release substrates in which there is a disproportionately significant decrease in the mechanical stability of the release layer. In the case of a content of polymeric binders above a proportion by mass of 94%, the mechanical stability of the release layer is sufficiently high, but it has been found that there is a disproportionately significant decrease in the release properties. In-house studies have shown here that it is possible to obtain particularly good release substrates with optimal release and mechanical properties when the content is a proportion by mass of polymeric binders of 50% to 11%.

It is particularly preferred in accordance with an aspect of the invention here when the proportion by mass of the polymeric binder in the release layer is 94% to 2% and the proportion by mass of the wax in the release layer is 6% (preferably 10%) to 98%, and it is even further preferable when the proportion by mass of the polymeric binder in the release layer is 80% to 10% and the proportion by mass of the wax in the release layer is 80% to 90%, and it is even further preferable when the proportion by mass of the polymeric binder in the release layer is 50% to 11% and the proportion by mass of the wax in the release layer is 50% to 89%.

In-house studies have shown that the choice of the polymeric binders described above as preferred and the setting of the ratio between polymeric binders and wax can adjust the release properties to the adhesives of different bond strength. This makes it possible to establish exactly defined/controlled separation properties of the release layer.

Preference is given in accordance with an aspect of the invention to release substrates in which the area-based mass of the release layer is in the range from 1.0 to 8 g/m$^2$, preferably in the range from 2.0 to 5.5 g/m$^2$, more preferably in the range from 3.0 to 5.0 g/m$^2$. It has been found that, surprisingly, release substrates having the lower area-based masses specified here have very good release properties. Although stability can be slightly improved by increasing the area-based mass, the improvement is only minimal, and so the elevated material consumption does not justify the slight improvement. In the case of an area-based mass of below 1.0 g/m$^2$, the stability of the pure carrier substrate is likewise improved, but the stability is not always sufficient for some fields of application (for example labels of high tack). In-house studies have shown that optimal properties can be obtained when the area-based mass of the release layer is in the range from 1.5 to 5.0 g/m$^2$.

In-house studies have shown that it is particularly advantageous when the polymeric binder consists of two or more polymeric binders and at least one binder is an anionic binder. An anionic binder is understood here to mean a binder containing multiple negative charges that are stabilized by cations (e.g., metal cations or ammonium).

It is preferable here in accordance with an aspect of the invention when the glass transition temperature of the anionic binder determined by dynamic differential calorimetry (DSC) is not more than 120° C. In-house studies have shown that, in the case of the glass transition temperature above 120° C., the production of the release layer is very difficult and the release substrates produced do not have such good properties as release substrates of the invention that have been produced using an anionic binder having a glass transition temperature of not more than 120° C.

It is preferable here in accordance with an aspect of the invention when the anionic binder is a copolymer.

Suitable anionic binders are, for example, partly or fully deprotonated polyacrylic acid (or copolymers thereof, for example with acrylic esters), partly or fully deprotonated methacrylic acid (or copolymers thereof, for example with methacrylic esters), copolymers of polyacrylic esters (preferably methyl or ethyl esters), copolymers of polymethacrylic esters (preferably methyl or ethyl esters) or polyacrylamides or copolymers thereof.

It is preferable in accordance with an aspect of the invention when an aqueous solution or dispersion of the anionic binder has a basic pH when it is dissolved or dispersed in water with a proportion by mass of 10%, preferably within the range from 8 to 10.

In order to determine the pH of the anionic binder, an aqueous solution or dispersion of the anionic binder that has a proportion by mass of 10% can be prepared, and the pH can be determined in a standard manner.

In a likewise preferred configuration of the present invention, the release layer (12) additionally comprises a wax based on saturated hydrocarbons.

In-house studies have surprisingly shown that the combination of a wax based on a vegetable oil and a wax based on saturated hydrocarbons leads to particularly good release properties. The combination of saturated hydrocarbons and waxes composed of fatty acid triglyceride appears to lead to layers having particularly high molecular densities. Without wishing to be tied to a particular theory, the high molecular density can be explained in that the saturated hydrocarbons fill the lipophilic portions of the waxes composed of fatty acid triglycerides. This achieves a release property that cannot be achieved with the waxes composed of fatty acid triglycerides or of waxes based on saturated hydrocarbons alone. The combination of a wax based on a vegetable oil and a wax based on saturated hydrocarbons thus has a synergistic effect that leads to particularly good release properties.

This synergistic effect is particularly marked when the wax based on saturated hydrocarbons is octacosane and/or the wax based on a vegetable oil is a wax based on soya oil.

Preference is given in accordance with an aspect of the invention to release substrates wherein the wax based on saturated hydrocarbons has a melting point above 40° C., preferably above 50° C., more preferably above 60° C.

Preference is given in accordance with an aspect of the invention to release substrates wherein the wax based on saturated hydrocarbons comprises or consists of one, two, three or more than three alkanes selected from the group consisting of heneicosane, docosane, tricosane, tetracosane, pentacosane, hexacosane, heptacosane, octacosane, nonacosane, triacontane, hentriacontane, dotriacontane, tritriacontane, tetratriacontane, pentatriacontane, hexatriacontane, heptatriacontane, octatriacontane and nonatriacontane, preferably selected from the group consisting of hexacosane, heptacosane, octacosane, nonacosane and triacontane. Particular preference is given in accordance with the invention to barrier papers wherein the wax based on saturated hydrocarbons is a wax based on octacosane.

More preferably in accordance with an aspect of the invention, the acrylate copolymer in the barrier layer is a copolymer having an average molar mass in the range from 50,000 to 150,000 g/mol, preferably in the range from 80,000 to 130,000 g/mol, more preferably in the range from 90,000 to 100,000 g/mol. The average molar mass is determined here with the aid of gel permeation chromatography (GPC) with tetrahydrofuran (THF; tetramethylene oxide; 1,4-epoxybutane; oxacyclopentane) as solvent, polystyrene as standard and detection by RI detector (refractive index detector).

More preferably in accordance with an aspect of the invention, the acrylate copolymer in the barrier layer is a copolymer prepared using two, three, four, five, six or all monomers selected from the group consisting of methyl acrylate, methyl methacrylate, butyl acrylate, butyl methacrylate, 2-ethylhexyl acrylate, 2-ethylhexyl methacrylate and styrene.

Through a selection of the monomers used for preparation of the acrylate copolymer, it is possible to optimize the properties of the resulting acrylate copolymer. In-house studies have surprisingly shown that an acrylate copolymer that has been prepared from methyl acrylate, methyl methacrylate, butyl acrylate, butyl methacrylate, 2-ethylhexyl acrylate, 2-ethylhexyl methacrylate and/or styrene has particularly good release properties.

As well as methyl acrylate, methyl methacrylate, butyl acrylate, butyl methacrylate, 2-ethylhexyl acrylate, 2-ethylhexyl methacrylate and styrene, further monomers may have been used here for preparation of the acrylate copolymer, or the copolymer has been prepared from two, three, four, five, six or all monomers selected from the group consisting of methyl acrylate, methyl methacrylate, butyl acrylate, butyl methacrylate, 2-ethylhexyl acrylate, 2-ethylhexyl methacrylate and styrene.

More preferably in accordance with an aspect of the invention, the acrylate copolymer is a random copolymer.

Particular preference is given in accordance with an aspect of the invention to a release substrate (10) comprising
a) a paper substrate (11) having a front side and a reverse side opposite the front side, and
b) a release layer (12) disposed on the front side and/or reverse side of the paper substrate, consisting of or comprising
i) an acrylate copolymer having an average molar mass in the range from 50,000 to 150,000 g/mol, where the acrylate copolymer has been prepared from two, three, four, five, six or seven monomers selected from the group consisting of methyl acrylate, methyl methacrylate, butyl acrylate, butyl methacrylate, 2-ethylhexyl acrylate, 2-ethylhexyl methacrylate and styrene, and
ii) a wax based on saturated hydrocarbons, where the wax based on saturated hydrocarbons is preferably octacosane, or where the wax based on saturated hydrocarbons preferably comprises octacosane, and
iii) a wax based on a vegetable oil.

Preference is given in accordance with an aspect of the invention to a release substrate wherein the mass ratio between the polymeric binder and the wax based on saturated hydrocarbons is 999:1 to 70:30, is preferably 99:1 to 80:20, and is more preferably 95:5 to 85:15.

In one configuration of the present invention, the release layer (12) does not comprise any colorants, especially any organic (optionally synthetic) or inorganic colorants (or color pigments). More particularly, preferably in accordance with the invention, the release layer does not comprise any carbon black as pigment. More particularly, the release layer (12) of the invention does not comprise any of the colorants described in paragraphs [0060] to [0063] of DE 602004005746 T1 that are referred to as pigments or colorants therein.

Preference is given in accordance with the invention to a release substrate wherein the release layer (12) is disposed over the full area of the front side and/or reverse side of the carrier substrate. In the context of the present invention, the "full area" is understood to mean a coating of more than 99% of the area. Preference is given in accordance with the invention to a release substrate wherein the release layer (12) does not comprise any organic solvents, especially any alcohols (for example methanol, ethanol, propanol, isopropanol, n-butyl alcohol, isobutyl alcohol or sec-butyl alcohol), ketones, esters, ethers, aliphatic solvents, aromatic solvents. These solvents cannot be removed completely in the release layers produced from the release coat and remain in traces in the release layers produced.

Preferable is given in accordance with an aspect of the invention to a release substrate wherein the release substrate additionally contains an interlayer (13) and the interlayer is disposed between the carrier substrate and the release layer. It has been found in in-house studies that the properties of the resulting release substrate are particularly good when the release layer is not applied directly to the carrier substrate, but an interlayer is applied to the carrier substrate first. This is especially advantageous when the carrier substrate is a paper substrate or paperboard substrate.

It is preferable in accordance with an aspect of the invention here when the interlayer (13) comprises a pigment.

A release substrate is preferable in accordance with an aspect of the invention when the pigment is an organic pigment, inorganic pigment or a mixture of organic pigments and inorganic pigments.

A release substrate is preferable in accordance with an aspect of the invention when the pigment is an inorganic pigment selected from the list consisting of calcined kaolin, kaolin, kaolinite, magnesium silicate hydrate, silicon oxide, bentonite, calcium carbonate, aluminum hydroxide, aluminum oxide and boehmite.

In-house studies have shown that particularly good properties can be obtained when the pigment is in platelet form, preferably with an aspect ratio of 5 to 100, more preferably 15 to 100, further preferably 20 to 80. The aspect ratio is the quotient between the diameter and thickness of the platelet of the pigment prior to mixing with the further components. An aspect ratio of 20 means that the diameter of the platelet is 20 times greater than the thickness of the platelet. Kaolin, kaolinite and talc, for example, are in platelet form and are therefore particularly preferred as pigment.

A release substrate is preferred in accordance with the an aspect of invention when the proportion by mass of the pigment in the interlayer is 5% to 60%, preferably 15% to 40%, more preferably 20% to 40%, based on the total mass of the interlayer.

A release substrate is preferred in accordance with an aspect of the invention when the interlayer contains a binder, and the binder is preferably a crosslinked or uncrosslinked binder selected from the group consisting of starch, polyvinyl alcohol, carboxyl group-modified polyvinyl alcohol, ethylene-vinyl alcohol copolymer, a combination of polyvinyl alcohol and ethylene-vinyl alcohol copolymer, ethylene-vinyl acetate copolymer, silanol group-modified polyvinyl alcohol, diacetone-modified polyvinyl alcohol, acrylate copolymer, modified polyethylene glycol, unmodified polyethylene glycol, α-isodecyl-ω-hydroxypoly(oxy-1,2-ethanediyl), styrene-butadiene latex, styrene-acrylate polymers, film-forming acrylic copolymers and mixtures thereof.

Preference is given in accordance with an aspect of the invention to a release substrate when the binder comprises or consists of one or more acrylate copolymers and/or styrene-acrylate polymers.

In one configuration of the release substrate of the invention, the carrier substrate may be coated with a reverse side layer on the reverse side of the carrier substrate, i.e., the side of the carrier substrate on which there is no release layer. This reverse side layer may have the same configuration as the interlayer described further up.

In a further configuration of the release substrate of the invention, the carrier substrate may have both a reverse side layer and an interlayer, where these layers have the same configuration as the interlayer described further up.

In a further configuration of the release substrate of the invention, the carrier substrate may have been coated with the release layer on both sides, it being preferable in accordance with the invention when both release layers comprise or consist of a polymeric binder and a wax based on a vegetable oil and can at the same time have the configurations described for the release layer above.

Preference is given in accordance with an aspect of the invention to a release substrate where the release substrate additionally has a heat-sensitive recording layer (14) disposed between the release layer and the carrier substrate. Heat-sensitive recording layers contain at least one dye precursor and at least one (color) developer reactive with this at least one dye precursor. It is particularly preferable here when the heat-sensitive recording layer is disposed between an interlayer disposed atop the carrier substrate and a release layer.

It has been found that, surprisingly, release layers used in accordance with the invention have high to sufficient transparency, such that it is possible to read a printed image that has been printed in the heat-sensitive recording layer beneath the release layer.

Examples of the composition of a heat-sensitive recording layer can be found in the following table:

| Function | Trade name | Chem. name | CAS number | Parts by mass [%] |
| --- | --- | --- | --- | --- |
| Developer | D8 | 4-Hydroxy-4'-isopropoxydiphenyl sulfone | 95235-30-6 | 27-29 |
| Sensitizer | EGTE | 1,2-Bis(3-methylphenoxy)ethane | 54914-85-1 | 19-21 |
| Pigment | Martifin OL 107 | Aluminum hydroxide | 21645-51-2 | 9.5-11.5 |
| Optical brightener | Tafluonol CPD T/P | 1,4-Benzenedisulfonic acid, 2,2'-(1,2-ethenediylbis((3-sulfo-4,1-phenylene)imino(6-(4-morpholinyl)-1,3,5-triazine-4,2-diyl)imino))bis-, hexasodium salt | 52301-70-9 | 0.25-0.5 |
| Binder | NL-08 | PVA | | 9.5-11.5 |
| Binder | Gohsefirmer Z-200 | Acetoacetyl-modified PVA | | 2.5-3.5 |
| Additive | Hidorin J-157 | Paraffin wax | 8002-74-2 | 2.5-3.5 |
| Colorant | ODB-2 | 3-dibutylamino-6-methyl-7-anilinofluoran | 89331-94-2 | 18-20 |

Alternative coating compositions for production of a heat-sensitive recording layer may comprise the following components, for example:
one or more dye precursors; and
one or more color developers, where the one or at least one of the multiple color developers is a compound that contains, in the color developer,
a) at least one (linear) structural unit of the formula (I) (also understood and referred to hereinafter as lactic acid unit)

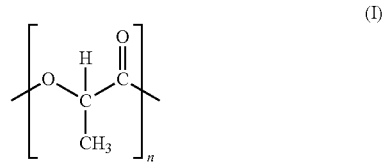

where n is an integer from 1 to 10, preferably from 1 to 6; and
b) independently one, two or more terminal electron acceptor groups, where at least one of the electron acceptor groups is not a carboxyl group (—COOH) that comes from lactic acid and/or a polylactic acid having the structural unit of the formula (I);
with the proviso that the one or the at least one of the multiple color developers is not a compound of the formula (A)

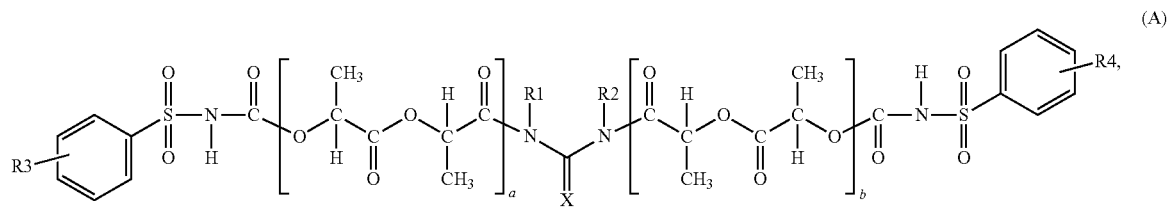

where X is O, S or NH; R1 and R2 are independently a hydrogen atom, a C1-C6-alkyl group, a C3-C6-cycloalkyl group or a C2-C6-alkenyl group; R3 and R4 are independently a hydrogen atom, a C1-C6-alkyl group, a C1-C6-alkoxy group or a halogen group; and a and b are each an integer and fulfill the conditions a≥0, b≥0 and (a+b)≥1.

It has been found that these heat-sensitive recording layers including color developers comprising lactic acid units can be produced from renewable raw materials. The combination of these heat-sensitive recording layers with release layers used in accordance with the invention leads to heat-sensitive recording materials having a release layer that can be produced entirely or predominantly from renewable raw materials and may additionally also be recyclable or compostable. The combination is thus much more environmentally compatible than all thermal papers with a release layer that are known to date in the prior art.

In one configuration of the present invention, the release layer can be used in combination with an adhesive-containing layer (15) disposed on the other side, in order to enable the coated substrate to roll off in a simple manner in a paper substrate wound in a roll that firstly has the release layer and secondly the adhesive layer.

Thus, for example, a heat-sensitive recording layer is implemented atop the precoat in order to enable thermal functionality. The next layer applied may optionally be a color coat for formation of a protective layer, for example a protective layer in the form of a pigment-containing protective coat that can also be called a "topcoat". This layer serves to improve the mechanical strength of the laminar composite. Preferably, however, the release layer can be applied directly to the heat-sensitive recording layer. The release layer can alternatively also be applied to the protective layer. On the opposite side of the carrier substrate from the release layer, an adhesive-containing color coat is frequently applied. Before the adhesive-containing color coat, it is likewise possible to apply a color coat to the carrier substrate as precoat or backside coat. A color coat as backside coat can also be applied to the reverse side of a carrier substrate without the application of further color coats. A substrate coated in this way then serves for the production of adhesive labels as usable, for example, in balances with integrated or connected thermal printers in the vegetables department of a supermarket.

Examples of pigment-containing protective coats can be found in the following table:

| Function | Trade name | Chem. name | Parts by mass [%] |
|---|---|---|---|
| Pigment | ASP 179 | Kaolin | 30 to 40 |
| Pigment | Sipernat 22S | Silica | 2 to 4 |
| Polyvinyl alcohol | Gohsenx Z-410 | Acetoacetyl-modified polyvinyl alcohol | 5 to 15 |
| Polyvinyl alcohol | Gohsenx Z-200 | Acetoacetyl-modified polyvinyl alcohol | 20 to 50 |
| Crosslinker | Giluton 20XP | Polyamidoamine epichlorohydrin resin | 1.5 to 3.5 |
| Alkylene/(meth)-acrylic acid copolymer | Aquacer 1061 | Ethylene-acrylic acid copolymer | 1.5 to 4.5 |
| Crosslinker | SPM-01/SPM-02 | Sodium/calcium glyoxylate | 0.5 to 2.0 |

A further aspect of the present invention relates to a use of a release substrate of the invention for protection of tacky surfaces of self-adhesive labels from soiling or inadvertent sticking or transfer substrate.

It is preferable in accordance with an aspect of the invention when the release layer of the release substrate has a Bekk smoothness determined to ISO 5627 in the range from 100 to 1200 s. In a departure from ISO 5627, Bekk smoothness is not determined on both sides of the release substrate, but only on the release layer of the release substrate.

The present invention further provides for the use of a release substrate of the invention as self-adhesive ticket, self-adhesive sales receipt, self-adhesive label or self-adhesive entry tickets.

A further aspect of the present invention relates to a process for producing a release substrate, preferably a release substrate of the invention, comprising the following steps:

(i) producing or providing a carrier substrate, (ii) producing or providing a release coat comprising a wax emulsion, where the wax is a wax based on a vegetable oil, (iii) applying the release coat to one side of the carrier substrate and then drying the release coat, resulting in a release layer.

It is preferable in accordance with an aspect of the invention here when the wax emulsion is a wax-in-oil emulsion and the wax emulsion additionally contains an anionic polymeric binder which is preferably suitable for stabilizing the wax emulsion.

It is preferable in accordance with an aspect of the invention when the release coat produced or provided contains not only the wax emulsion but also a (further) polymeric binder.

It is preferable in accordance with an aspect of the invention when the average particle size of the wax particles is in the range from 600 to 1100 nm, preferably in the range from 700 to 1000 nm. The particle size of the wax particles can be determined using laser diffraction particle size analysis. In-house studies have shown that particles in this order of magnitude lead to release layers having very good release and mechanical properties since there is good mixing between polymeric binders and wax particles.

It is preferable in accordance with an aspect of the invention when the wax emulsion is basic and preferably has a pH in the range from 8 to 10.

It is preferable in accordance with an aspect of the invention when the wax based on a vegetable oil is a soya wax.

It is preferable in accordance with an aspect of the invention when the release coat is dried at a temperature above the melting point of the wax (for example at 40, 60, 80 or 100° C.) and/or, in a separate step, the carrier substrate containing the (optionally dried) release coat is heated above the melting point of the wax (for example to 40, 60, 80 or 100° C.).

In an inventive configuration of the process, the carrier substrate used is a coated carrier substrate, preferably paper substrate, or a coat is applied to one side of the carrier substrate and then the coat is dried, so as to result in an interlayer, before the release coat is applied. The process of the invention thus preferably additionally has the following steps:

a) producing or providing a coat comprising pigments and binders, b) applying the coat produced or provided to one side of the paper substrate and then drying the coat, so as to result in an interlayer, where steps a) and b) are preferably conducted between steps i) and ii).

Preference is given to a process of the invention that additionally includes the following steps:

c) producing or providing a thermal coat comprising at least one dye precursor and a (color) developer that reacts with the dye precursor when heat is supplied, d) applying the thermal coat produced or provided to one side of the paper substrate and then drying the coat, so as to result in a heat-sensitive recording layer, where steps c) and d) are preferably conducted between steps i) and ii), more preferably after steps a) and b), the thermal coat preferably being applied to the interlayer.

Preference is given to a process of the invention additionally comprising the following steps e) producing or providing an adhesive, f) applying the adhesive produced or provided to the reverse side (or to the) side of the paper substrate (remote from the release layer), where steps e) and f) are preferably conducted after step iii).

Preference is given to a process of the invention wherein the release coat used does not comprise any organic solvents, especially any alcohols (for example methanol, ethanol, propanol, isopropanol, n-butyl alcohol, isobutyl alcohol or sec-butyl alcohol), ketones, esters, ethers, aliphatic solvents, aromatic solvents. These solvents cannot be removed completely in the release layers produced from the release coat and remain in traces in the release layers produced.

A further aspect of the present invention relates to a release substrate produced by a process of the invention.

A further aspect of the present invention relates to the use of a wax based on a vegetable oil for production of a coating, preferably for production of a release layer on a carrier. More preferably, the carrier is a paper, a paperboard or a cardboard.

In the context of the present invention, preferably two or more of the aspects described above as preferred are implemented simultaneously; especially preferred are the combinations of such aspects and the corresponding features that are apparent from the appended claims.

BRIEF DESCRIPTION OF THE DRAWINGS

Further embodiments are apparent from the working examples elucidated in detail in the figures and the examples. In the drawings.

DETAILED DESCRIPTION OF THE PRESENTLY PREFERRED EMBODIMENTS

Figure 1:
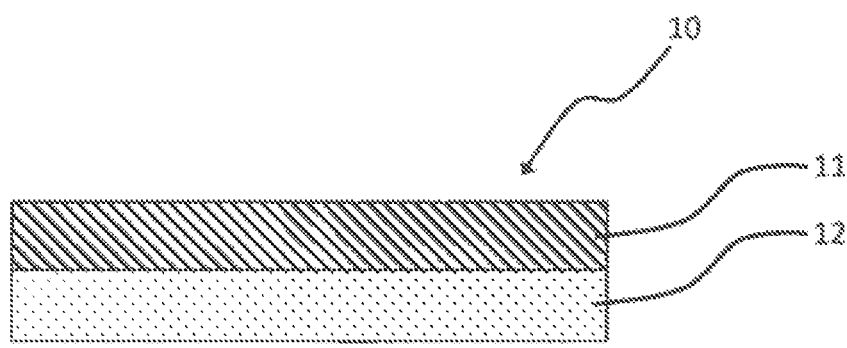
FIGS. 1 to 9 show possible layer structures of release substrates in accordance with embodiments of the invention.

FIG. 1 shows a release substrate 10 consisting of a carrier substrate 11 (for example paper or a film) and a release layer 12. The carrier substrate 11 has a front side and a reverse side opposite the front side, and disposed on the front side of the carrier substrate 11 is a release layer 12 consisting of a polymeric binder and a wax based on a vegetable oil.

Figure 2:
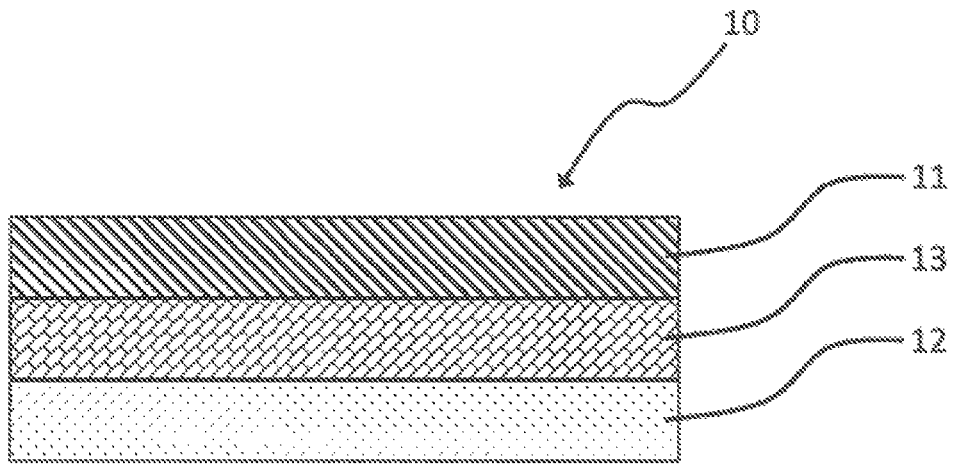

FIG. 2 shows a release substrate 10 consisting of a carrier substrate 11 (for example paper or a film), an interlayer 13 and a release layer 12. The carrier substrate 11 has a front side and a reverse side opposite the front side, and disposed on the front side of the carrier substrate 11 is the interlayer 13. Disposed atop the interlayer 13 in turn is the release layer 12 consisting of a polymeric binder and a wax based on a vegetable oil. The interlayer 13 preferably contains a pigment and a binder.

Figure 3:
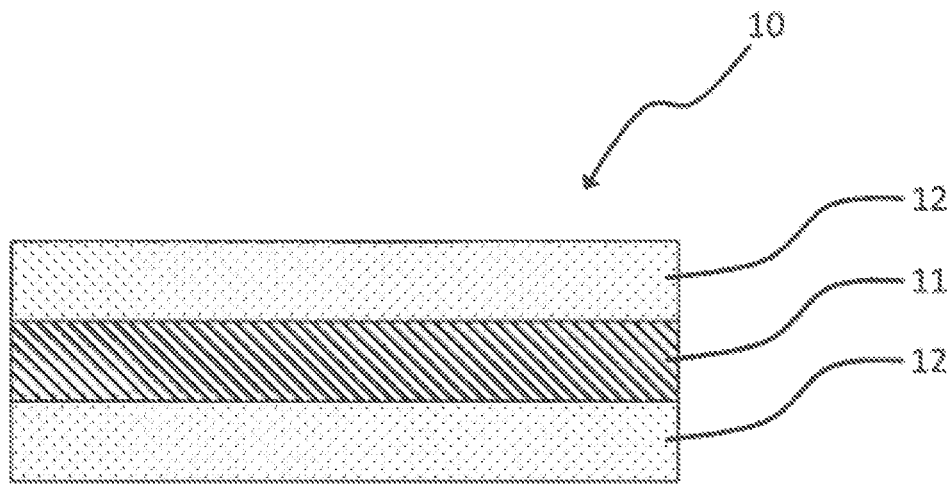

FIG. 3 shows a release substrate 10 consisting of a carrier substrate 11 (for example paper or a film) and two release layers 12. The carrier substrate 11 has a front side and a reverse side opposite the front side, and disposed on each of the front side and the reverse side of the carrier substrate 11 is the release layer 12 consisting of a polymeric binder and a wax based on a vegetable oil.

Figure 4:
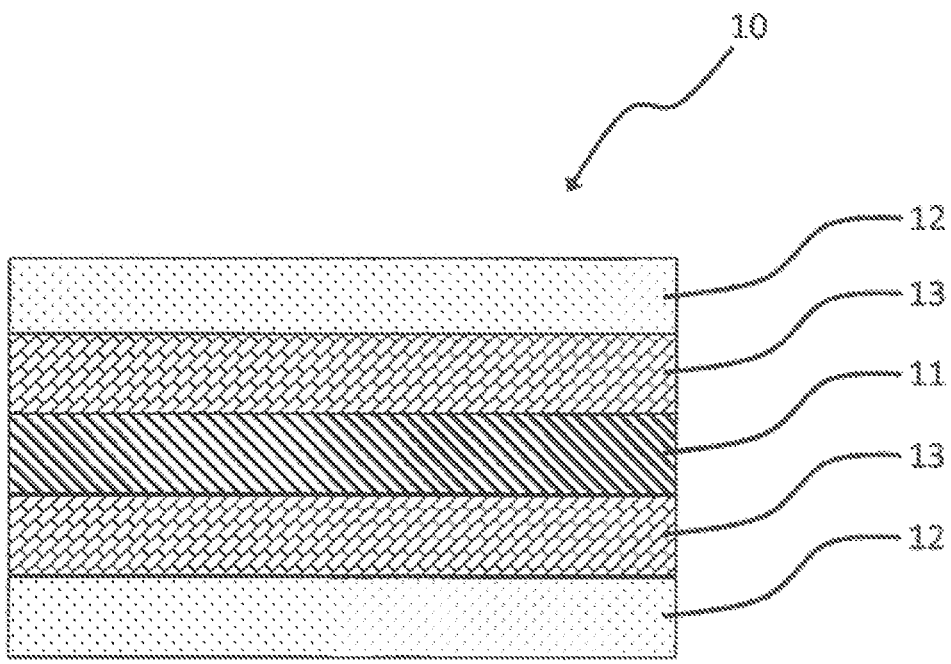

FIG. 4 shows a release substrate 10 consisting of a carrier substrate 11 (for example paper or a film), two interlayers 13 and two release layers 12. The carrier substrate 11 has a front side and a reverse side opposite the front side, and disposed on each of the front side and the reverse side of the carrier substrate 11 is an interlayer 13. Disposed atop each of the interlayers 13 in turn is a release layer 12 consisting of a polymeric binder and a wax based on a vegetable oil. The interlayers preferably contain a pigment and a binder.

Figure 5:
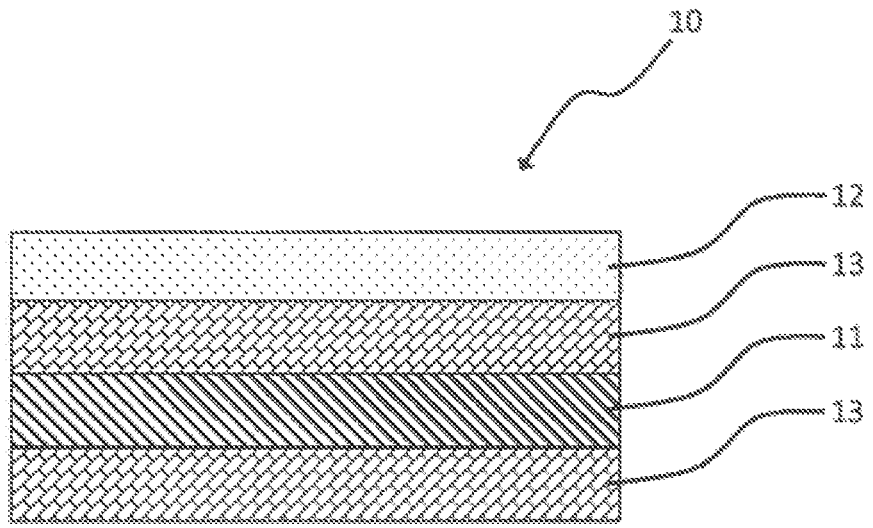

FIG. 5 shows a release substrate 10 consisting of a carrier substrate 11 (for example paper or a film), two interlayers 13 and one release layer 12. The carrier substrate 11 has a front side and a reverse side opposite the front side, and disposed on each of the front side and the reverse side of the carrier substrate is an interlayer 13. Disposed atop one of the interlayers 13 in turn is the release layer 12 consisting of a polymeric binder and a wax based on a vegetable oil. The interlayers preferably contain a pigment and a binder.

Figure 6:
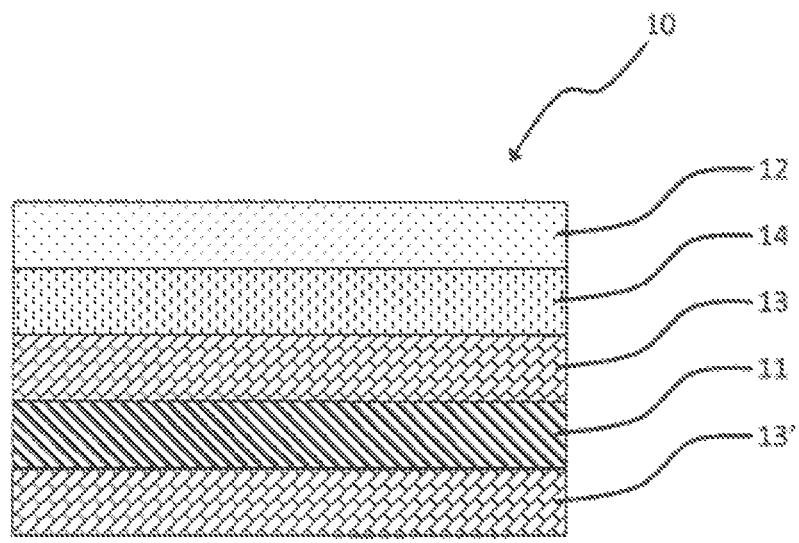

FIG. 6 shows a release substrate 10 having thermal printing properties, consisting of a carrier substrate 11 (for example paper or a film), two interlayers 13 and 13', a heat-sensitive recording layer 14 and a release layer 12. The carrier substrate 11 has a front side and a reverse side opposite the front side, and disposed on each of the front side and the reverse side of the carrier substrate 11 is an interlayer 13 and 13'. In an alternative embodiment, it is possible to dispense with the interlayer 13' or to replace the layer with an adhesive layer. Disposed atop the front-side interlayer 13 is a heat-sensitive recording layer 14, atop which in turn is disposed the release layer 12 consisting of a polymeric binder and a wax based on a vegetable oil. Preferably, the interlayers 13 and 13' contain a pigment and a binder. The heat-sensitive recording layer 14 contains a dye precursor and a (color) developer that reacts with the dye precursor when heat is supplied.

Figure 7:
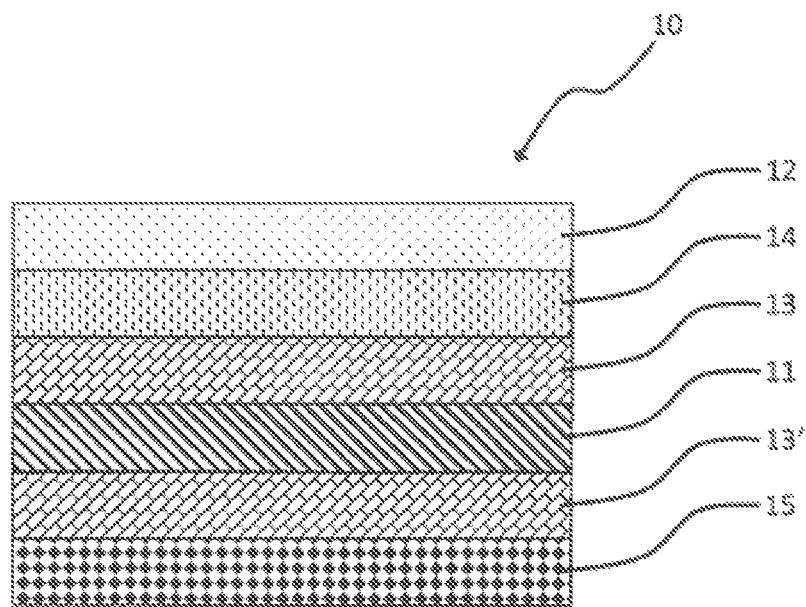

FIG. 7 shows a release substrate 10 having thermal printing properties, consisting of a carrier substrate 11 (for example paper or a film), two interlayers 13 and 13', a heat-sensitive recording layer 14, a release layer 12 and an adhesive layer 15. The carrier substrate 11 has a front side and a reverse side opposite the front side, and disposed on each of the front side and the reverse side of the carrier substrate 11 is an interlayer 13 and 13'. In an alternative configuration, it is possible to dispense with the interlayer 13', such that the adhesive layer 15 lies directly atop the carrier substrate 11. Atop the front-side interlayer 13 is disposed a heat-sensitive recording layer 14, atop which there is in turn disposed the release layer 12 consisting of a polymeric binder and a wax based on a vegetable oil. Preferably, the interlayers 13 and 13' contain a pigment and a binder. The heat-sensitive recording layer 14 contains a dye precursor and a (color) developer that reacts with the dye precursor when heat is supplied. Disposed atop the interlayer 13' arranged on the reverse side is an adhesive layer 15. The release substrate can be produced in the form of a long web and then rolled up such that the adhesive layer 15 lies atop the release layer 12 and can be pulled off without residue when required.

Figure 8:
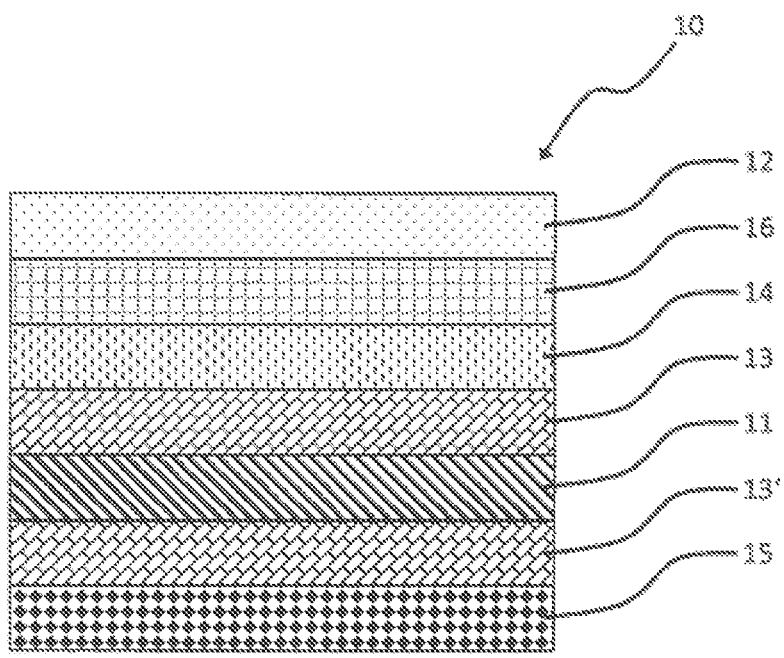

FIG. 8 shows a release substrate 10 having thermal printing properties. The release substrate depicted differs from the release substrate depicted in FIG. 7 by the presence of a protective layer 16 (topcoat) between the heat-sensitive recording layer 14 and the release layer 12. Protective coats used may be standard protective coats that are known as a protective coat and in the prior art.

Figure 9:
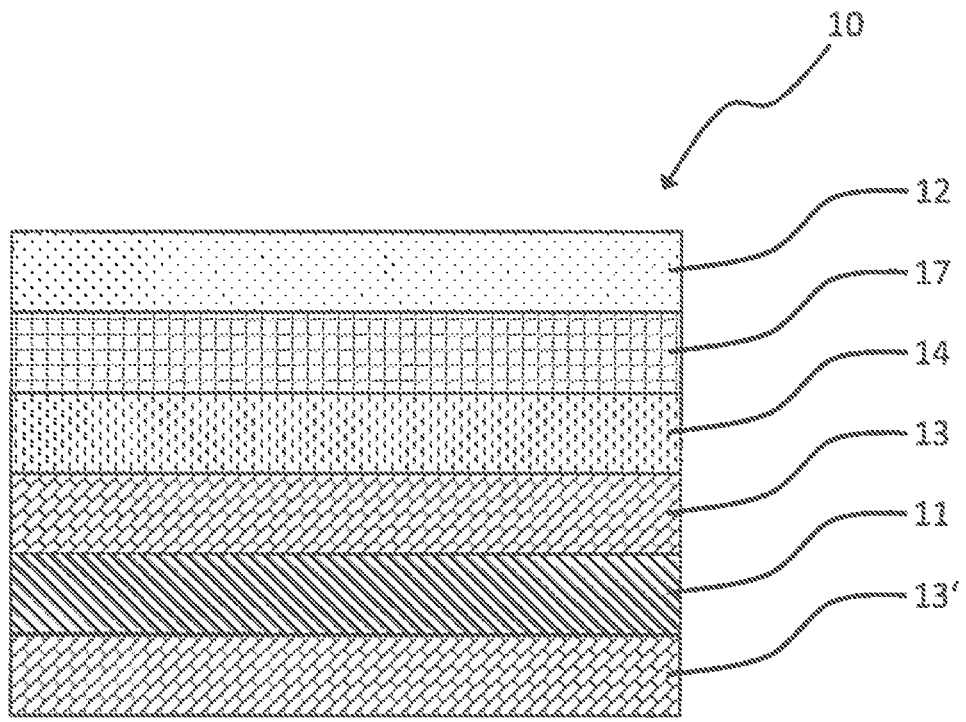

FIG. 9 shows a release substrate 10 having thermal printing properties, consisting of a carrier substrate 11 (for example paper or a film), two interlayers 13 and 13', a heat-sensitive recording layer 14, an additional interlayer 17 and a release layer 12. The carrier substrate 11 has a front side and a reverse side opposite the front side, and disposed on each of the front side and the reverse side of the carrier substrate 11 is an interlayer 13 and 13'. In an alternative configuration, it is possible to dispense with the interlayer 13'; the layer can be replaced by an adhesive layer or the layer can be coated with an adhesive layer. Disposed atop the front-side interlayer 13 is the heat-sensitive recording layer 14, atop which there is in turn disposed an additional interlayer 17. The interlayer 17 may have the same configuration as the interlayer 13. Disposed atop the interlayer 17 is the release layer 12 consisting of a polymeric binder and a wax based on a vegetable oil. Preferably, the interlayers 17, 13 and 13' contain a pigment and a binder. The heat-sensitive recording layer 14 contains a dye precursor and a (color) developer that reacts with the dye precursor when heat is supplied.

EXAMPLE 1

Production of a Release Substrate of the Invention

As carrier substrate, a paper was produced from short fiber materials (100% short fiber pulp) with a refining level of 50° SR and an addition with a proportion by mass of 1% talc as filler, based on the total mass of the paper, on a papermaking machine, a paper web engine-sized with resin and having an area-based mass of 33.3 g/m². The carrier substrate produce was calendered at a linear load of 100 kN/m and a temperature of 100° C.

A curtain coater was used to apply a precoat to the front side, comprising water, an aqueous dispersion of an acrylic-acetate copolymer (solids content 33%, proportion by mass in the precoat 0.03% (otro); Sterocoll BL), an aqueous dispersion of an acrylic copolymer (solids content 40%, proportion by mass in the precoat 1.27% (otro); trade name: Sterocoll FS), an aqueous dispersion of a styrene-acrylate copolymer (solids content 50%, proportion by mass in the precoat 70.5% (otro); trade name: Sterocoll FS), and kaolin (solids content 70%, proportion by mass in the precoat 28.2% (otro); trade name: Capim NP), with a coat weight of 3.5 g/m² of the paper, and the precoat was then dried by IR (infrared radiation) and air drying, so as to result in an interlayer.

A curtain coater was used to apply a release coat to the interlayer, comprising water, a wax based on a vegetable oil (solids content 30%, proportion by mass in the precoat 82% (otro); trade name: SWX 155), a polyacrylate dispersion (solids content 48%, proportion by mass in the precoat 16.4% (otro); trade name: Tecryl PB 16/3), and a mixture of nonionic surfactants (solids content 100%, proportion by mass in the precoat 1.6% (otro); trade name: Metolat 700), with a coat weight of 4 g/m², and the release coat was then dried by IR (infrared radiation) and air drying, so as to result in a release layer.

The finished release substrate (release paper) showed extremely good release properties with respect to customary adhesive labels, and it was possible to efficiently remove even strongly adhering adhesive labels. Even when the labels were pulled off quickly at a sharp angle, the release layer did not become detached from the carrier substrate.

It has additionally been found that the release substrate was compostable.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A release substrate (10) comprising:
   a carrier substrate (11) having a front side and a reverse side opposite the front side; and
   a release layer (12) disposed on the front side and/or the reverse side of the carrier substrate,
   wherein the carrier substrate is a paper substrate or paperboard substrate,
   wherein the release layer comprises a polymeric binder and a wax based on a vegetable oil, wherein the wax based on the vegetable oil is obtained by a chemical modification of the vegetable oil,
   wherein:
   the polymeric binder is a crosslinked or uncrosslinked binder selected from the group consisting of: starch, carboxyl group-modified polyvinyl alcohol, ethylene-vinyl alcohol copolymer, a combination of polyvinyl alcohol and ethylene-vinyl alcohol copolymer, ethylene-vinyl acetate copolymer, silanol group-modified polyvinyl alcohol, diacetone-modified polyvinyl alcohol, acrylate copolymer, modified polyethylene glycol, a-isodecyl-w-hydroxypoly(oxy-1,2-ethanediyl), styrene-butadiene latex, styrene-acrylate polymers and mixtures thereof,
   the proportion by mass of the polymeric binder in the release layer is 94% to 2%, based on the total mass of the release layer;
   the proportion by mass of the wax in the release layer is 6% to 98%, based on the total mass of the release layer,
   and wherein
   the release substrate additionally contains an interlayer (13, 13') and the interlayer is disposed between the carrier substrate and the release layer
   and
   the interlayer (13) comprises an inorganic pigment selected from the group consisting of calcined kaolin, kaolin, kaolinite, magnesium silicate hydrate, silicon oxide, bentonite, calcium carbonate, aluminum hydroxide, aluminum oxide and boehmite.

2. The release substrate according to claim 1, wherein the wax based on a vegetable oil comprises a wax based on an oil selected from the group consisting of: palm oil, coconut oil, poppyseed oil, olive oil, linseed oil, soya oil, sunflower oil, safflower oil and rapeseed oil.

3. The release substrate according to claim 1, wherein the wax based on a vegetable oil comprises a wax based on a soya oil.

4. The release substrate according to claim 1, wherein the proportion by mass of the wax in the release layer is 10% to 98%, or 20% to 90%, or 50% to 89%, based on the total mass of the release layer.

5. The release substrate according to claim 1, wherein the proportion by mass of the wax in the release layer is 50% to 78%, based on the total mass of the release layer.

6. The release substrate according to claim 1, wherein the wax has a melting point above 40° C., or above 50° C., or above 60° C.

7. The release substrate according to claim 1, wherein the polymeric binder comprises one or more styrene-acrylate polymers.

8. The release substrate according to claim 1, wherein the proportion by mass of the polymeric binder in the release layer is 80% to 10%, based on the total mass of the release layer.

9. The release substrate according to claim 1, wherein the proportion by mass of the polymeric binder in the release layer is 50% to 11%, based on the total mass of the release layer.

10. The release substrate according to claim 1, wherein the release substrate further comprises a heat-sensitive recording layer (14) containing a dye precursor and a color developer that reacts with the dye precursor when heat is supplied.

11. The release substrate according to claim 1, wherein the release layer (12) additionally comprises a wax based on saturated hydrocarbons.

12. A method for producing the release substrate according to claim 1, comprising:
   providing the carrier substrate;
   providing a release coat comprising a wax emulsion, where the wax is the wax based on the vegetable oil; and
   applying the release coat to one side of the carrier substrate and then drying the release coat, to produce the release layer.

* * * * *